US010027719B2

(12) United States Patent
Österlund et al.

(10) Patent No.: US 10,027,719 B2
(45) Date of Patent: Jul. 17, 2018

(54) RESOLVING COMPETING HANDOVER CONDITIONS IN WIRELESS NETWORKS

(71) Applicant: TELEFONAKTIEBOLAGET LM ERICSSON (PUBL), Stockholm (SE)

(72) Inventors: Håkan Österlund, Ekerö (SE); Afshin Abtin, Sollentuna (SE); Magnus Hallenstål, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 86 days.

(21) Appl. No.: 15/324,345

(22) PCT Filed: Jul. 7, 2014

(86) PCT No.: PCT/EP2014/064415
§ 371 (c)(1),
(2) Date: Jan. 6, 2017

(87) PCT Pub. No.: WO2016/004968
PCT Pub. Date: Jan. 14, 2016

(65) Prior Publication Data
US 2017/0180429 A1 Jun. 22, 2017

(51) Int. Cl.
*H04W 4/00* (2018.01)
*H04L 29/06* (2006.01)
(Continued)

(52) U.S. Cl.
CPC ...... *H04L 65/1006* (2013.01); *H04L 65/1009* (2013.01); *H04W 36/0066* (2013.01);
(Continued)

(58) Field of Classification Search
None
See application file for complete search history.

(56) References Cited

U.S. PATENT DOCUMENTS

2007/0297373 A1 12/2007 Saifullah et al.
2010/0081428 A1 4/2010 Maejima et al.
(Continued)

FOREIGN PATENT DOCUMENTS

WO 2010077689 A1 7/2010
WO 2013104651 A1 7/2013

OTHER PUBLICATIONS

3GPP TS 23.402 V12.4.0 3rd Generation Partnership Project; Technical Specification Group Services and System Aspects; Architecture enhancements for non-3GPP accesses (Release 12), Mar. 2014.
(Continued)

*Primary Examiner* — Minh-Trang Nguyen

(57) ABSTRACT

One aspect includes a method of operating a user terminal adapted for wireless telecommunications using any of a plurality of different radio access technologies including a Circuit Switched, CS, access and a Packet Switched, PS access. The PS access includes access via a Long Term Evolution, LTE, network and WiFi access via a Wireless Local Area Network, WLAN. The method includes: (i) making a determination to switch from a PS LTE access to a WiFi access, (ii) switching to WiFi access, and (iii) ignoring or rejecting a command received to hand over to a CS access. Other aspects include a user terminal, a telecommunications network entity, and a method of operating a telecommunications network entity.

15 Claims, 9 Drawing Sheets

(51) Int. Cl.
*H04W 36/00* (2009.01)
*H04W 36/08* (2009.01)
*H04W 36/18* (2009.01)
*H04W 36/36* (2009.01)
*H04W 36/14* (2009.01)
*H04W 80/04* (2009.01)

(52) U.S. Cl.
CPC ....... *H04W 36/0077* (2013.01); *H04W 36/08* (2013.01); *H04W 36/14* (2013.01); *H04W 36/18* (2013.01); *H04W 36/36* (2013.01); *H04W 80/04* (2013.01)

(56) References Cited

U.S. PATENT DOCUMENTS

| | | | | |
|---|---|---|---|---|
| 2010/0309843 | A1* | 12/2010 | Mahendran | H04W 36/0022 370/328 |
| 2013/0281154 | A1* | 10/2013 | Aerrabotu | H04B 1/406 455/553.1 |
| 2015/0024751 | A1* | 1/2015 | Wong | H04W 36/0022 455/436 |
| 2016/0021579 | A1* | 1/2016 | Mufti | H04W 36/0022 370/331 |
| 2016/0037327 | A1* | 2/2016 | Stegall | H04W 8/04 455/435.2 |

OTHER PUBLICATIONS

3GPP TS 24.237 V12.4.0 3rd Generation Partnership Project; Technical Specification Group Core Network and Terminals; IP Multimedia (IM) Core Network (CN) subsystem IP Multimedia Subsystem (IMS) Service Continuity; Stage 3 (Release 12), Mar. 2014.

3GPP TS 23.216 V12.0.0 3rd Generation Partnership Project; Technical Specification Group Services and System Aspects; Single Radio Voice Call Continuity (SRVCC); Stage 2 (Release 12), Dec. 2013.

* cited by examiner

RESOLVING COMPETING HANDOVER CONDITIONS IN WIRELESS NETWORKS

This application is a 371 of International Application No. PCT/EP2014/064415, filed Jul. 7, 2014, the disclosure of which is fully incorporated herein by reference.

TECHNICAL FIELD

The present invention relates to methods and apparatus in a telecommunications network for resolving conflicts that can arise when handing over calls between different wireless networks. In particular solutions are presented for resolving a competing Single Radio Voice Call Continuity handover and a handover to a WiFi access.

BACKGROUND

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows person-to-person (client-to-client) as well as person-to-content (client-to-server) communications over an IP-based network. The IMS makes use of the Session Initiation Protocol (SIP) and Session Description Protocol (SDP) to set up and control calls or sessions between user terminals (or user terminals and application servers). Whilst SIP was created as a user-to-user protocol, IMS allows operators and service providers to control user access to services and to charge users accordingly.

A User Equipment (UE) can access the IMS by attaching to an access network. If the access network is a Packet Switched (PS) network, such as an Evolved Packet Core (EPC)/Long Term Evolution (LTE) access network, an IMS session can be set up by the UE using SIP signalling. However, many existing access networks only support Circuit Switched (CS) technology for telephony with good enough quality of service, and procedures are well established for dealing with the provision of media and services to a UE accessing the IMS via a CS access network.

There are many occasions when during a call/session it is required to transfer or hand over the call/session from one access network to another. Single Radio Voice Call Continuity (SRVCC) is described in 3GPP TS 23.237 and 3GPP TS 23.216, which specify procedures for handover of a voice call from a PS access to a CS access (e.g. transfer of a VoIP IMS session from an evolved UMTS Radio Access Network—E-UTRAN—to a UTRAN or GSM Edge RAN—GERAN).

Accordingly, Voice over LTE (VoLTE) networks and devices that support co-existence with CS technology will normally have support for SRVCC. 3GPP TS 24.402 specifies procedures for non-3GPP access with the introduction of EPC integrated WLAN. This integrates WLAN as an additionally supported access technology to LTE and CS for a voice service (VoWiFi). However situations can arise where a competing or 'race' condition arises between a SRVCC (LTE to CS) handover and a WLAN handover (LTE to WiFi), when a UE leaves LTE coverage.

More particularly, when a user device that supports VoLTE, VoWiFi and CS voice communications as well as SRVCC is attached to a LTE access and has an ongoing call that experiences a drop of signal quality, the device may decide to initiate a voice call handover to WiFi (if available). At the same time, the serving eNodeB (radio access node in LTE) may decide to initiate a SRVCC handover based on measurement reports received from the device. If these competing handover procedures are allowed to continue unchecked a potential call failure may occur.

The embodiments presented herein address these problems, noting that it is normally desirable to maintain PS connectivity in order to maintain communication enrichments such as conversational video.

SUMMARY

One aspect includes a method of operating a user terminal adapted for wireless telecommunications using any of a plurality of different radio access technologies including a Circuit Switched, CS, access and a Packet Switched, PS access. The PS access includes access via a Long Term Evolution, LTE, network and WiFi access via a Wireless Local Area Network, WLAN. The method includes: (i) making a determination to switch from a PS LTE access to a WiFi access, (ii) switching to WiFi access, and (iii) ignoring or rejecting a command received to hand over to a CS access.

Another aspect includes a method of operating a telecommunications network entity to control which of a plurality of different radio access technologies is used to support a session of a user terminal. The radio access technologies include a Circuit Switched, CS, access and a Packet Switched, PS access. The PS access includes access via a Long Term Evolution, LTE, network and WiFi access. The method comprises: receiving a Session Initiation Protocol, SIP, re-INVITE message from a user terminal, the message indicating that the user terminal is attached to the network via a WiFi access; and sending instructions to other network entities to ensure that the terminal continues with the WiFi access and is not handed over to a CS access.

Another aspect includes a user terminal adapted for wireless telecommunications using any of a plurality of different radio access methods including a Circuit Switched, CS, access and a Packet Switched, PS access. The PS access includes access via a Long Term Evolution, LTE, network and WiFi access. The user terminal is capable of switching between the different radio access methods. The user terminal is configured (i) to make a determination to switch from a PS LTE access to a WiFi access, and (ii) after switching to WiFi access to ignore or interrupt a command received to hand over to a CS access.

Another aspect includes a telecommunications network entity configured as an Access Transfer Control Function, ATCF. The entity includes an interface for sending and receiving communications to/from other entities in the network, a processor, and memory having instructions implemented by the processor. On receiving a Session Initiation Protocol, SIP, re-INVITE message from a user terminal indicating that the user terminal is attached to the network via a WiFi access, the processor causes the entity to send instructions to other network entities to ensure that the terminal continues with the WiFi access and is not handed over to a Circuit Switched, CS, access.

It is an advantage that IP (PS) connectivity can be maintained and that a coherent mechanism is provided for handling the situation where competing conditions arise between a SRVCC handover and a UE-initiated handover to WiFi. This minimizes the risk of call failure, and ensures that a call continues on a PS access whenever possible.

DETAILED DESCRIPTION

Figure 1:
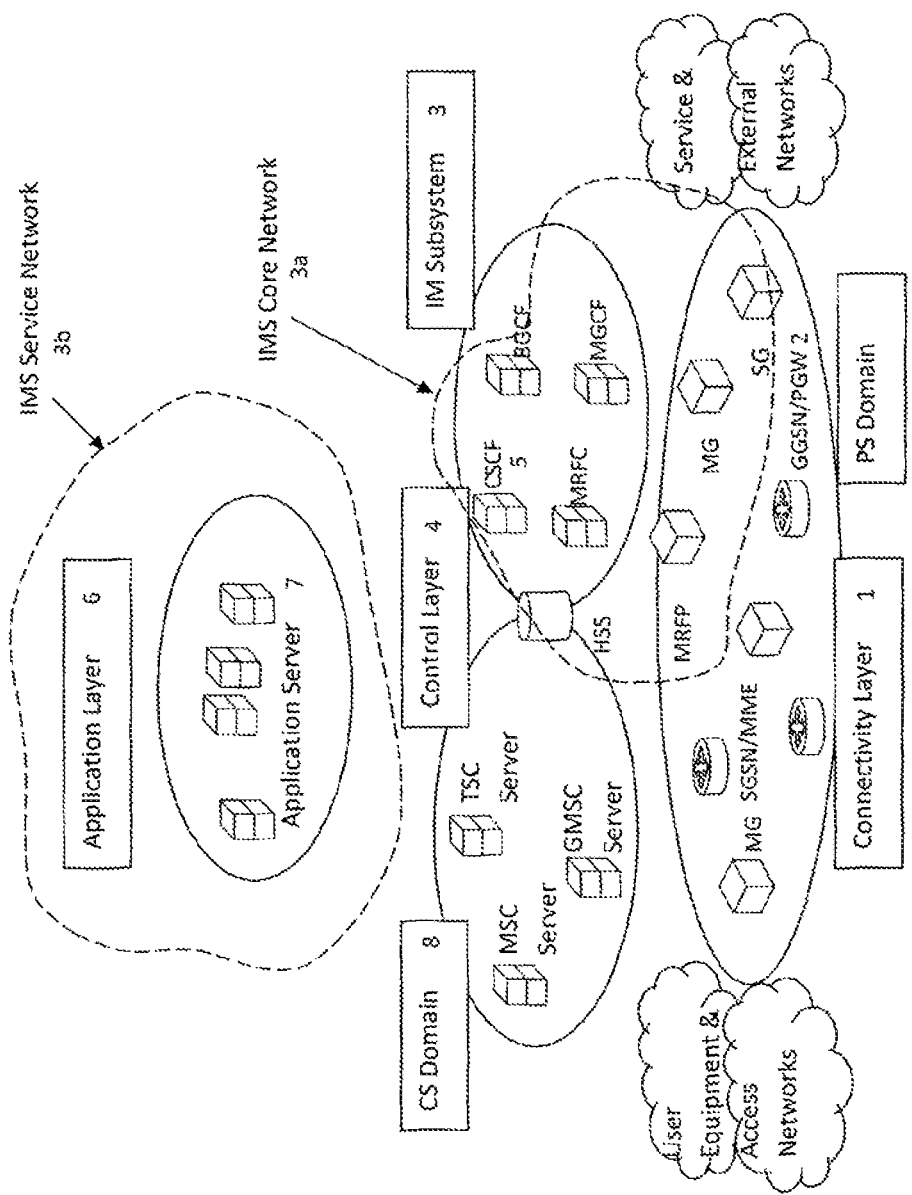
FIG. 1 illustrates schematically an IMS network in association with a cellular network architecture of a Packet Service access network.

FIG. 1 illustrates schematically how the IMS fits into the 3GPP cellular network architecture in the case of a Packet Service access network. As shown in FIG. 1 control of communications occurs at three layers (or planes). The lowest layer is the Connectivity Layer 1, also referred to as the bearer plane and through which signals are directed to/from user equipment (UE) accessing the network. The entities within the connectivity layer 1 that connect an IMS subscriber to IMS services form a network that is generally referred to as the IP-Connectivity Access Network, IP-CAN (which in this case is the 3GPP Packet Service access network). The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the 3GPP Packet Service access network at the Connectivity Layer 1 and network nodes that include Call/Session Control Functions (CSCFs) 5, which operate as SIP proxies within the IMS in the middle, Control Layer 4. The top, Application Layer 6 includes the IMS service network 3b. Application Servers (ASs) 7 are provided for implementing IMS service functionality.

As shown in FIG. 1, a User Equipment (UE) can access the IMS by attaching to an access network and then over the Connectivity Layer 1, which is part of a Packet Switched (PS) domain. For example, the UE may attach via an Evolved Packet Core (EPC)/Long Term Evolution (LTE) access. In that case an IMS session can be set up by the UE using SIP signalling. However, many existing access networks operate only using Circuit Switched (CS) technology, but a UE may also access IMS services via a CS domain 8. Although the CS domain will not handle SIP, procedures are well established for dealing with the provision of media and services between the IMS and a UE using a CS access.

There are many occasions when during a call/session it is required to transfer or hand over the call/session from one access network to another. There are a variety of factors that are used to determine when a call needs to be handed over to another access network. In general, the access network determines, based on the cells for which the UE reports measurements, when the conditions arise that require a request to be made to the core network for the call to be handed over.

Figure 2:
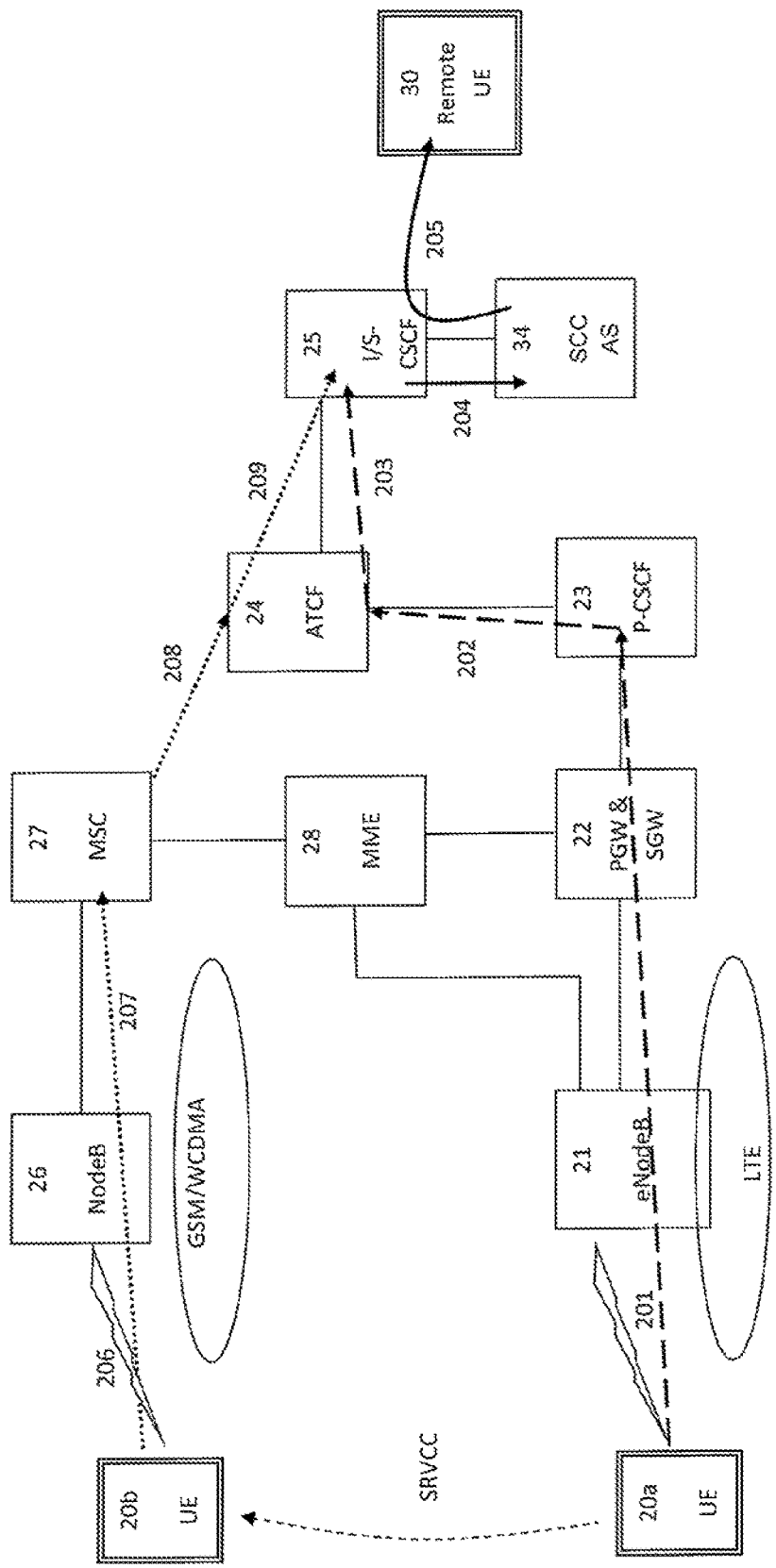
FIG. 2 illustrates schematically the principal network components involved in a SRVCC handover of a call from a PS access to a CS access.

FIG. 2 illustrates schematically the principal network components involved in a Single Radio Voice Call Continuity (SRVCC) handover of an emergency call from a PS access network (which in the illustration is a LTE access network as exemplified by the eNodeB 21 base station) to a CS access network (which in the illustration is a GSM/WCDMA access network containing a NodeB 26 base station). A UE 20 accesses an IMS network over the PS access network. The UE 20 is capable of accessing both the CS and the PS access network and has corresponding interfaces for each type of access. FIG. 2 shows the UE 20 in two positions: UE 20a using its PS access capability before the handover and UE 20b using its CS capability after the handover.

The UE 20a initiates a call over the PS access and the call is routed to an end point (in this case a remote UE 30) via the IMS, as shown by the dashed line arrows 201-203, followed by the solid arrows 204, 205. Handover of the call from the PS to the CS access is controlled by a Mobile Management Entity (MME) 28. After the handover of the call to the CS access, the call is routed from the UE20b via the IMS as shown by the dotted line arrows 205-209, followed by the solid arrows 204, 205.

The principal network entities shown for the PS access include the eNodeB 21, and a Packet Data Network Gateway and a Serving Gateway (PGW & SGW) 22, hereafter referred to as S/PGW 22. The call is routed via the IMS entities, Proxy-Call/Session Control Function (P-CSCF) 23 and an Interrogating-CSCF, which assigns a Serving CSCF, as illustrated by (I/S-CSCF) 25. For the CS access, the principal network entities through which the call is routed include the NodeB 26, and a Mobile Switching Centre (MSC) Server 27. Also shown in FIG. 2 in the IMS network is an Access Transfer Control Function (ATCF) 24, and Session Call Continuity Application Server (SCC AS) 34.

Figure 3:
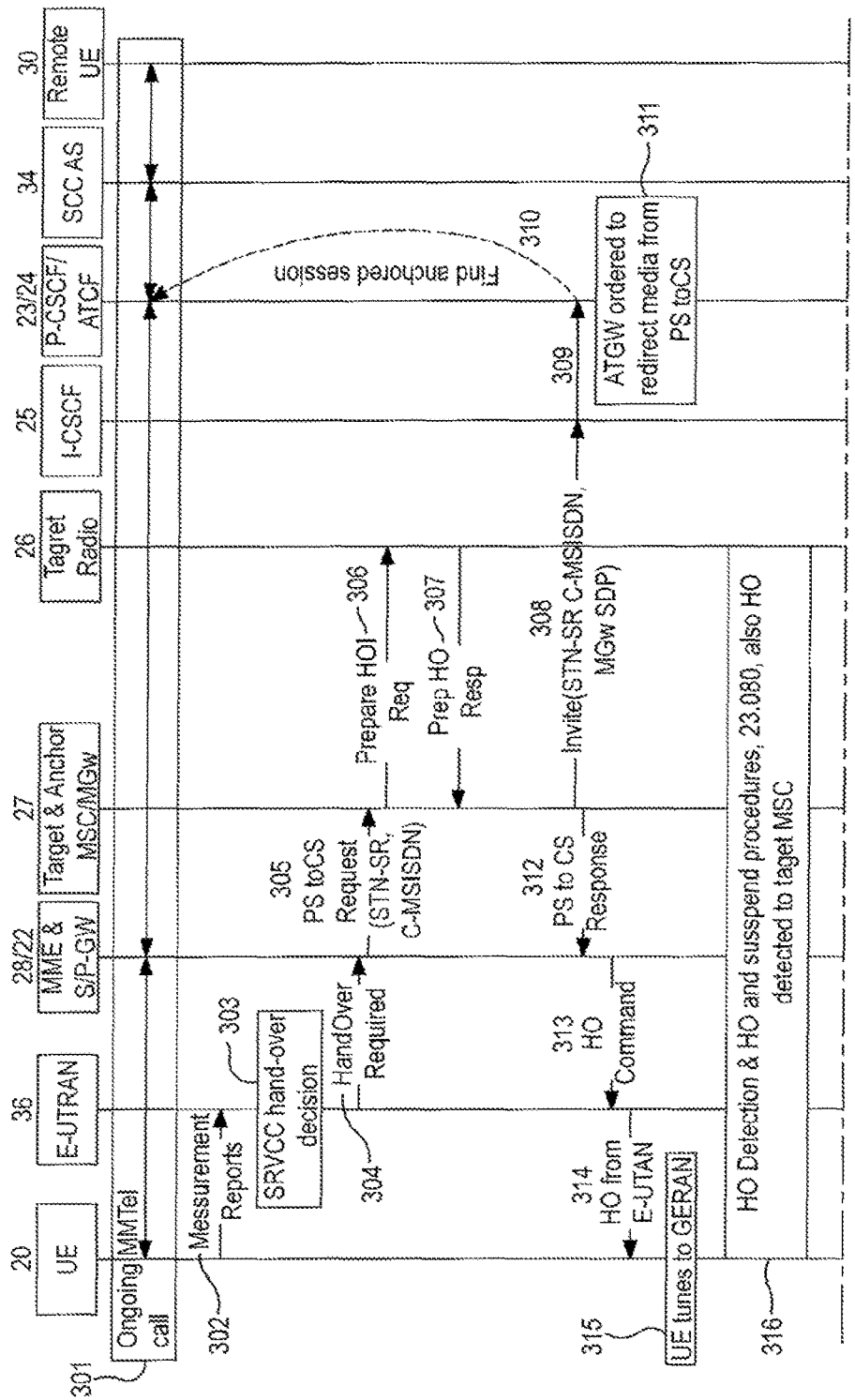
FIG. 3 is a signal diagram for a normal SRVCC handover of a call.
Figure 3:
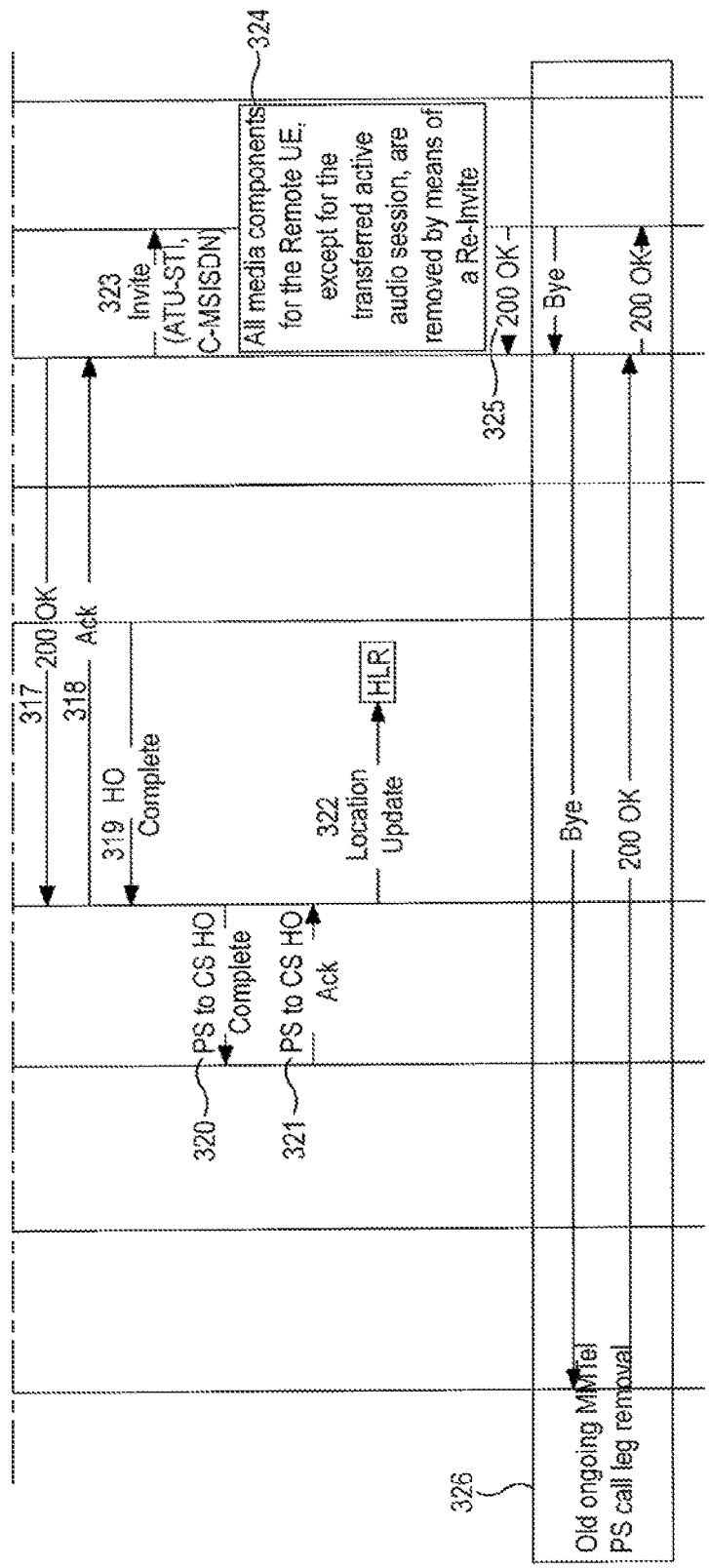

FIG. 3 is a signal flow diagram illustrating the signalling that occurs in a SRVCC handover of a call. The network entities shown at the top of the diagram have the same reference numerals as those shown in FIG. 2, and illustrates an SRVCC handover of an ongoing multimedia telephony (MMTel) call 301 from a PS to a CS access. As shown the call 301 proceeds via the S/P-GW 22, which shown in FIG. 3 together with the MME 28. The handover will transfer the call to a CS access, via the Target MSC/MGW 27, which will become the anchoring node. At step 302 measurement reports sent by the UE 20 to the access network, E-UTRAN 36, are analysed by the access network and determine, at step 303, that a SRVCC handover to a CS access is required. A handover required indication 304 is sent to the MME 28, which sends a handover request 305 to the MSC/MGW 27, including information as to the target RAN 26 to which the call is to be handed over. Signals 306 and 307 between the MSC/MGW 27 and target RAN 26 prepare for the handover. Once established, the MSC/MGW 27 sends a SIP INVITE 308 including the new routing information for the handed over call to the I-CSCF 25, which, at 309, forwards this to the P-CSCF/ATCF 23/24. At step 310, the P-CSCF/ATCF 23/24 finds the anchored session, and at step 311 sends a command to an Access Transfer Gateway (not shown) to route the media via the CS access.

The MSC/MGW 27 sends a PS to CS response 312 to the MME 28, which sends a handover (HO) command 313 to the E-UTRAN 36, which sends a handover command 314 to the UE 20. Note that these steps may occur in parallel with steps 308 to 311 and it is not necessarily the case that the SIP INVITE 308 is received and acted upon in the IMS network before the UE 20 has received the handover command from the E-UTRAN at step 314. At step 315 the UE retunes to the GERAN CS access. This results, as shown at step 316, in handover detection, a suspension of procedures and handover detection at the target MSC/MGW 27. Completion of the procedures is a shown at steps 317 to 326. Importantly, at step 323 the P-CSCF/ATCF 23/24 sends a SIP INVITE to the SCC AS 34, which, at step 324, results in all media components except for the active voice/audio session being removed. Also, at step 322 the MSC/MGW 27 sends a location update to the user's Home Location Register (HLR). Finally, the signals shown at 326 complete the process and the voice call proceeds via the CS access.

As previously explained, problems can arise if the UE decides to try to move to a WiFi access at the same time that a SRVCC handover is initiated. The embodiments described below establish a procedure that makes the IMS network and UE favor the handover to WiFi and abort the SRVCC handover. The procedures apply for cases when the UE detects and initiates a handover to WiFi before it has received a SRVCC handover command to hand over to a CS access. The procedures include features that impact the device (UE), as well as features that impact the IMS network.

The UE, once it has decided to connect to WiFi, is configured not to act on a handover command when received from the LTE network, either by ignoring the command or by sending a reject message, and to send a SIP re-INVITE to the IMS network as soon as WiFi connectivity is established. The SIP re-INVITE includes an indication that WiFi is in use.

In the IMS network, if a SRVCC INVITE has been received from an MSC before the re-INVITE is received from the UE with the indication of WiFi access, the IMS network will re-establish the session over the WiFi access, and will remove the session via the MSC. In the IMS, once the UE has sent the re-INVITE to announce its current access to be WiFi, a state parameter is set that will reject an incoming SRVCC INVITE from an MSC. This state will be cleared after a configurable timeout or when a new re-INVITE is received from the UE indicating that it is no longer communicating via WiFi access.

Figure 4:
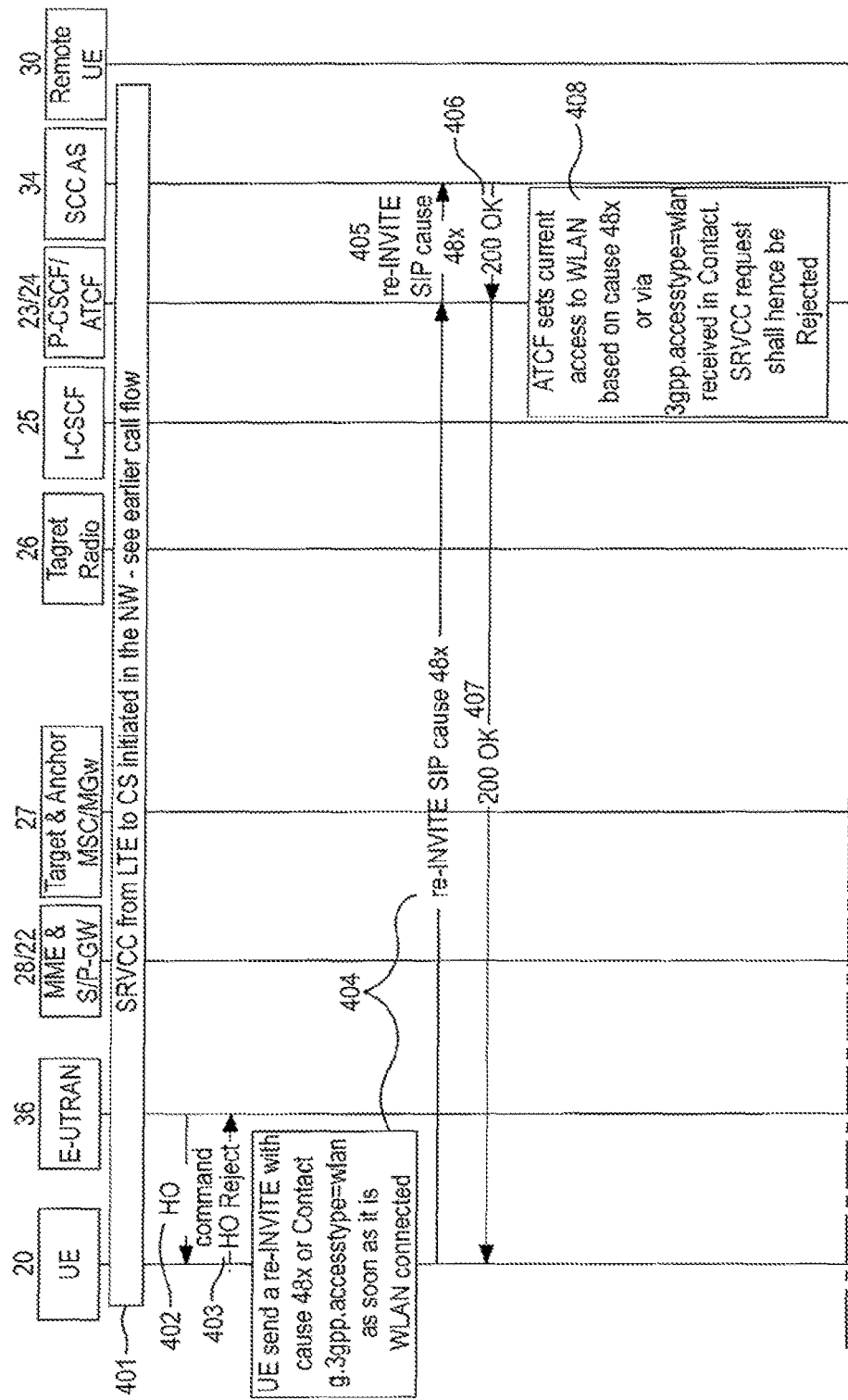
FIG. 4 is a signal diagram of an embodiment of a procedure for avoiding a handover race condition in one set of circumstances.
Figure 4:
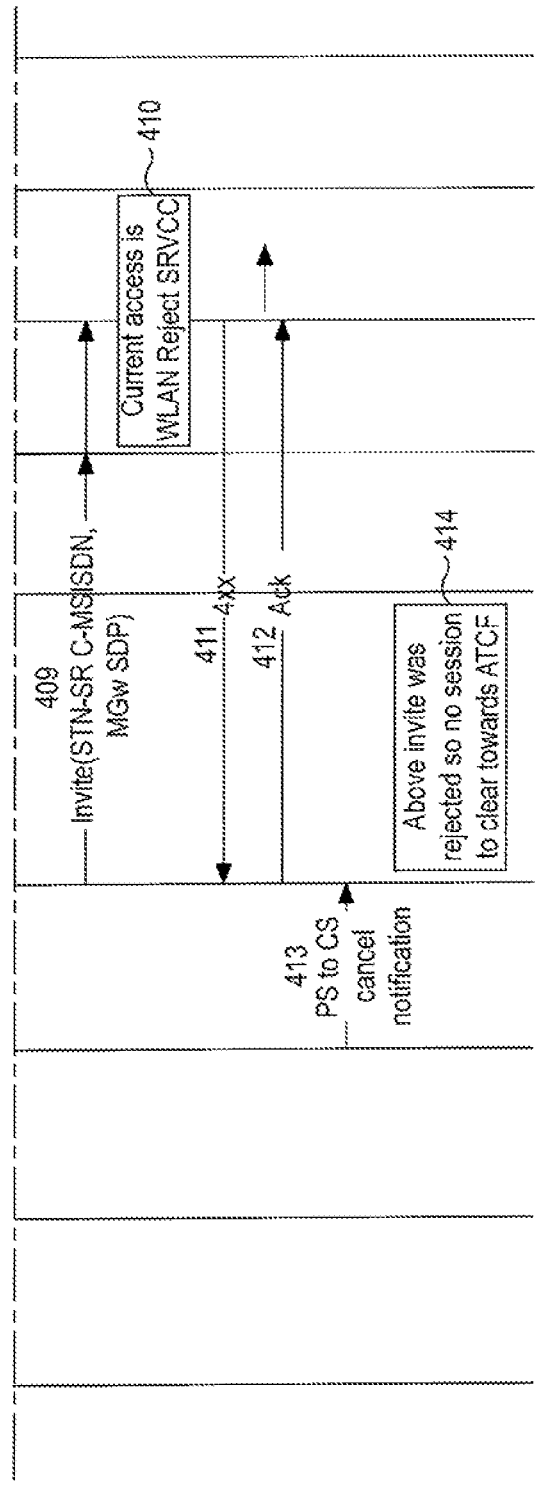

FIG. 4 illustrates a procedure that provides a solution to this problem in a first scenario. In this case, as shown at step 401, the SRVCC handover procedures are initiated in the network and a handover command 402 is sent to the UE (step 314 if FIG. 3). Now, instead of the UE 20 retuning (step 315 in FIG. 3), the UE 20 either ignores the handover command, or, as shown, sends a handover rejection 403 to the E-UTRAN 36, and as soon as it is connected to WiFi sends a re-INVITE 404 to the IMS specifying a cause 48x (where x is a numeral in the range 0-9, to be assigned) or other indication that the UE is now using a WLAN connection. However, in this scenario the handover command is sent to the UE before the SIP INVITE (step 308 in FIG. 3) is received and acted upon in the IMS network. At step 405 the P-CSCF/ATCF 23/24 forwards the re-INVITE to the SCC AS 34, and 200OK messages 406, 407 are returned to the UE. Next, at step 408, the P-CSCF/ATCF 23/24 sets a current access network parameter to WLAN, so that any subsequent SRVCC request message will be rejected. Thus, as shown at step 409, when the anchor MSC/MGW 27 sends an INVITE specifying the connection routing for the SRVCC handover to CS access (as at step 308 of FIG. 3). At step 410 the P-CSCF/ATCF 23/24 rejects this, because it has already set the current access parameter to WLAN at step 408, by sending a 4xx (where x and y are numerals in the range 0-9, to be assigned) error message 411 (i.e. an appropriate error message having an error code in the 400 range) via the I-CSCF 25 to the anchor MSC/MGW 27. This is acknowledged at step 412. At step 413 the MME 28 sends a PS to CS cancel notification to the target MSC/MGW 27. Accordingly, as indicated at step 414, because the session continues using WiFi, which maintains PS access, there is no need to remove the PS media components (as at step 328 of the SRVCC handover procedures illustrated in FIG. 3).

Figure 5:
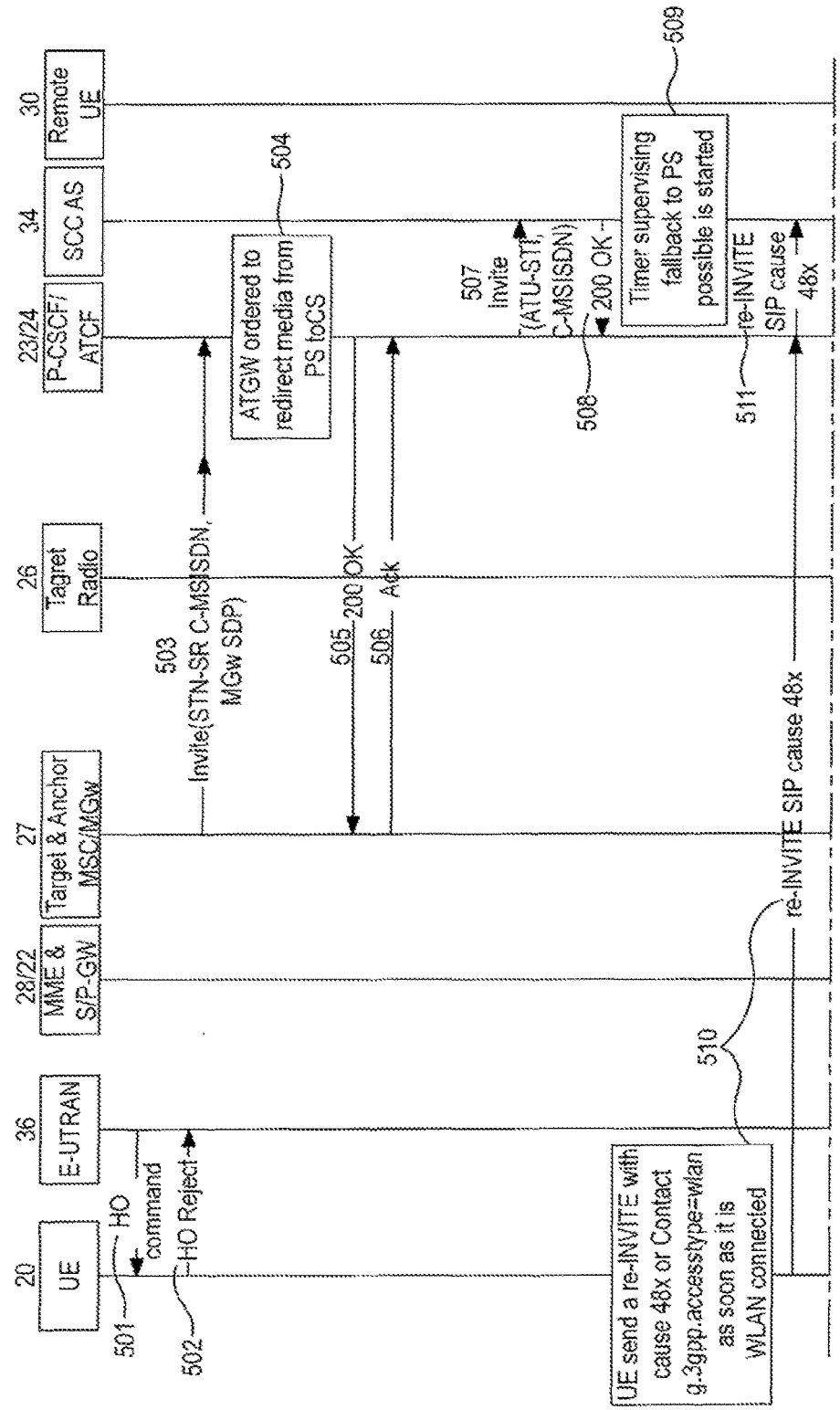
FIG. 5 is a signal diagram is a signal diagram of an embodiment of a procedure for avoiding a handover race condition in another set of circumstances.
Figure 5:
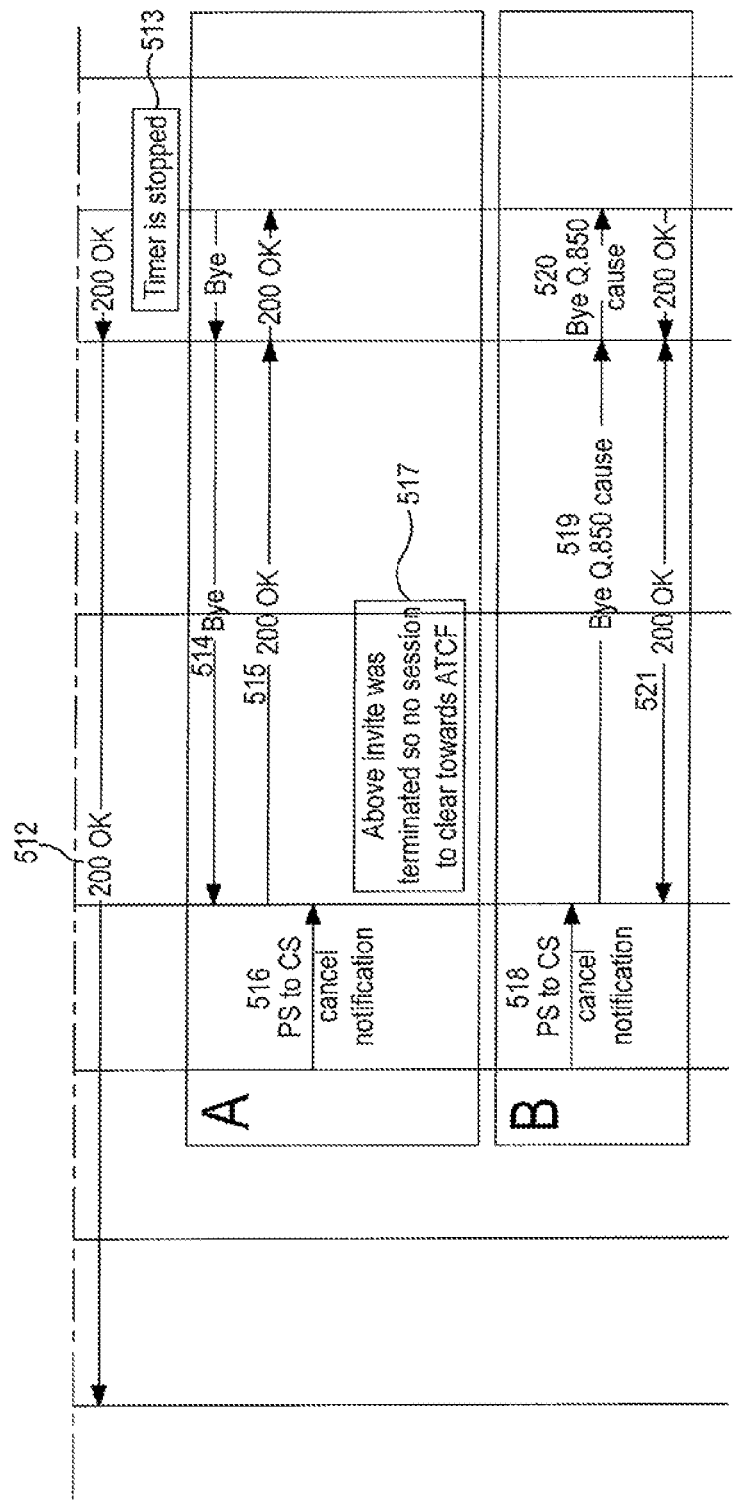

FIG. 5 shows the signalling sequence for the scenario where the SIP INVITE (step 308 in FIG. 3) is received and acted upon in the IMS network before the re-INVITE is sent by the UE 20. As shown, once the SRVCC handover procedures have been initiated in the network a handover command 501 is sent to the UE (step 314 in FIG. 3). The UE 20 either ignores the handover command or, as shown, responds by sending a handover rejection 502 to the E-UTRAN 36. At step 503 the Anchor MSC/MGW 27 sends an INVITE to the IMS to initiate the SRVCC handover procedure. At step 504 the ATGW (not shown) is ordered to start redirecting media from PS to CS access (step 311 of FIG. 3). At step 505 a SIP 200OK message is sent to the anchor MSC/MGW 27 and this is acknowledged at step 506. At step 507, the P-CSCF/ATCF 23/24 forwards the SRVCC SIP INVITE to the SCC AS 34, which returns a SIP 200 OK at step 508. At step 509 the SCC AS 34 initiates a fallback timer. This is a standard procedure (see 3GPP TS 24.237) used to allow the call to fall back to the PS access if the quality of the communications recover to an acceptable level before the timer has timed out, or if for any reason the UE 20 cannot complete the SRVCC handover.

Now, at step 510, the UE 20 has successfully connected to WiFi via a WLAN and sends a SIP re-INVITE to the IMS (in the same way as it did in the FIG. 4 scenario at step 404). This is forwarded to the SCC AS 34 at step 511. Assuming that this is received before the fallback timer has timed out, then at step 512 a 200 OK message is returned back to the UE 20 and at step 513 the fallback timer is stopped (before it has timed out). Note that if the fallback timer times out before the re-INVITE is received, then the SRVCC handover to CS will proceed, but because the UE is connected to WiFi the call will be dropped.

Finally, there are two possibilities for completing the process such that the established session with the Anchor MSC/MGW 27 is stopped and the call proceeds using WiFi. These are denoted as options A and B in FIG. 5. In option A the P-CSCF/ATCF 23/24 sends a SIP BYE 514 to the MSC/MGW 27, which responds with a SIP 200 OK message 515. When subsequently the MME 28 sends a PS to CS cancel notification 516, the anchor MSC/MGW 27 can ignore this because there is no longer any session to be cleared at the ATCF 24 (as shown at step 517). In Option B, when a PS to CS cancel notification 518 is received from the MME 28, the Anchor MSC/MGW 27 sends a SIP BYE 519 with a Q.850 cause to the P-CSCF/ATCF 23/24. This is forwarded at step 520 to the SCC AS 34, which then returns a SIP 200 OK message 521 via the P-CSCF/ATCF 23/24 to the MSC/MGW 27.

Figure 6:
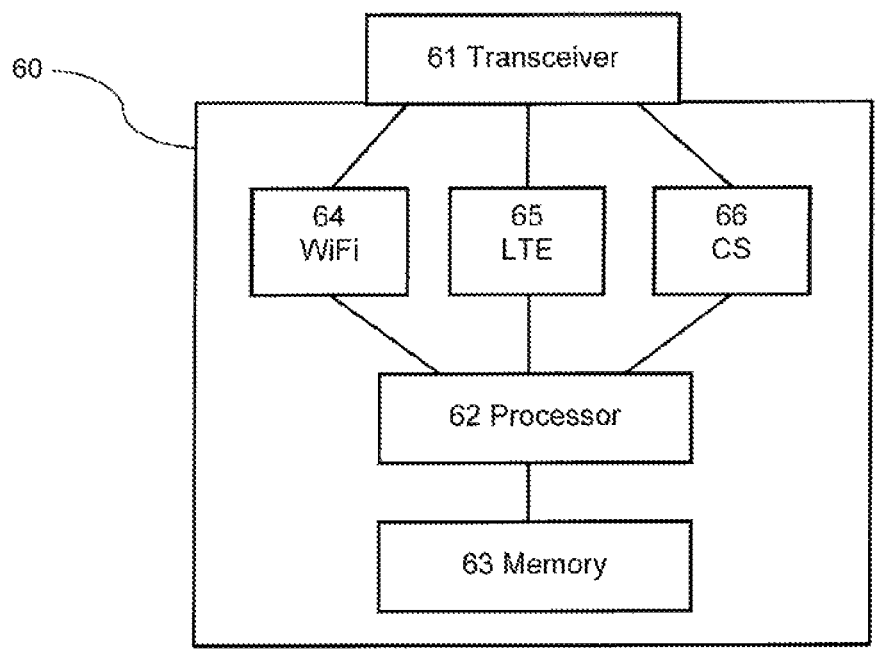
FIG. 6 is a schematic block diagram of a User Equipment (UE).

FIG. 6 is a schematic illustration of the principal functional components of a user terminal 60, such as UE 20 described above. The user terminal 60 is adapted for wireless telecommunications and includes a transceiver 61 for sending and receiving wireless communications, a processor 62 for executing program instructions and a memory 63 storing program instructions and data. The terminal is configured to be able to communicate using any of a number of different radio access methods and includes functional modules, including a CS module 66 for communicating using a CS access, and PS access modules that include a LTE access module 65 and a WiFi access module 64. The program instructions in the memory 63 include instructions that enable the terminal 60 to be able to switch between the different radio access methods, and include instructions that enable the terminal (i) to make a determination to switch from a PS LTE access to a WiFi access, and (ii) after switching to WiFi access to ignore or interrupt a command received to hand over to a CS access. The user terminal 60 may also be configured to perform any of the functionality required of the UE 20 described above.

Figure 7:
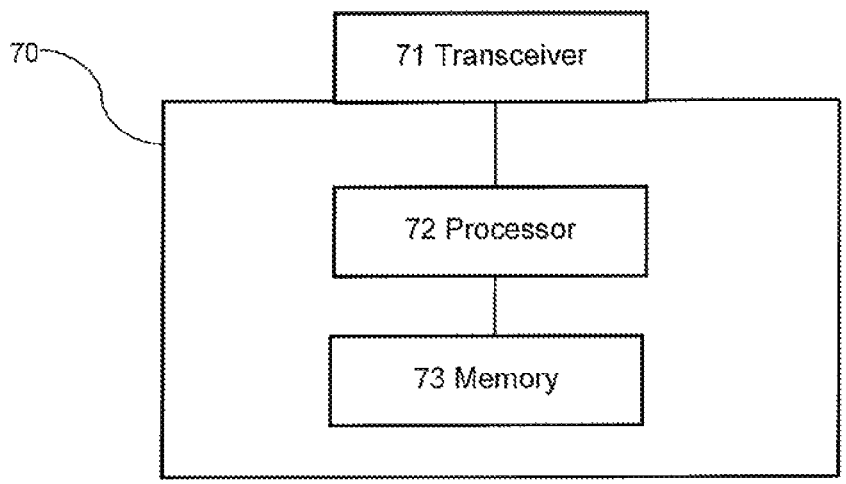
FIG. 7 is a schematic block diagram of a network entity.

FIG. 7 is a schematic illustration of the principal functional components of a telecommunications network entity 70 configured as an ATCF, such as the ATCF 24 described above. The network entity 70 includes an interface, or transceiver 71 for sending and receiving communications to/from other entities in the network, a processor 72, and a memory storing data and instructions implemented by the processor. The instructions cause the processor, on receiving a SIP re-INVITE message from a user terminal indicating that the user terminal is attached to the network via a WiFi access, to send instructions to other network entities to ensure that the terminal continues with the WiFi access and is not handed over to a CS access. The network entity 70 may also include programming instructions that cause the processor 70 to implement any of functions of the P-CSCF/ATCF 23/24 described above.

The embodiments described above provide a solution for allowing IP (PS) connectivity to be maintained and assuring coherent handling in the situation where competing conditions arise between a SRVCC handover and a UE-initiated handover to WiFi. This minimises the risk of call failure, and ensures that a call continues on a PS access whenever possible.

The invention claimed is:

1. A method implemented by a network entity in a telecommunications network for controlling which of a plurality of different radio access technologies is used to support a session of a user terminal, the radio access technologies including a Circuit Switched, CS, access and a Packet Switched, PS, access, wherein the PS access includes access via a Long Term Evolution, LTE, network and a WiFi access via a Wireless Local Area Network, WLAN, the method comprising:
receiving a Session Initiation Protocol, SIP, re-INVITE message from the user terminal, the SIP re-INVITE message indicating that the user terminal with the session is attached to the telecommunications network via WiFi access; and
sending instructions to other network entities to ensure that the user terminal continues the session with the WiFi access and that the session is not handed over to the CS access per Single Radio Voice Call Continuity, SRVCC, procedures.

2. The method of claim 1, further comprising, after receiving the SIP re-INVITE message, and upon receiving a message from a Mobile Switching Centre, MSC, requesting a hand-over to the CS access, sending a response rejecting the handover request together with an error indication.

3. The method of claim 1, further comprising, after receiving a message from a MSC requesting a handover to the CS access and initiating a handover procedure, and on receiving the SIP re-INVITE message, terminating the handover procedure.

4. The method of claim 3, further comprising, on receiving the message requesting a handover to the CS access, initiating a fallback timer, wherein receiving the SIP re-INVITE message stops the fallback timer to terminate the handover procedure.

5. The method of claim 3, further comprising, on receiving the SIP re-INVITE message, sending a message to the MSC to terminate the handover procedure.

6. A user terminal adapted for wireless telecommunications using any of a plurality of different radio access technologies including a Circuit Switched, CS, access and a Packet Switched, PS access, wherein the PS access includes access via a Long Term Evolution, LTE, network and a WiFi access via a Wireless Local Area Network, WLAN, wherein the user terminal is capable of switching between the different radio access technologies, and wherein the user terminal comprising:
a processor; and,
a memory that stores program instructions, wherein the processor interfaces with the memory to execute the program instructions, whereby the user terminal is operable to:
make a determination to switch a session from the PS LTE access to the WiFi access;
switch to the WiFi access;
send a Session Initiation Protocol, SIP, re-INVITE message to a telecommunications network, wherein the SIP re-INVITE message indicating that the user terminal with the session is attached to the telecommunications network via the WiFi access; and
after the switch to the WiFi access, ignore or reject a command received to hand over the session to the CS access, where the command is based on Single Radio Voice Call Continuity, SRVCC, procedures.

7. The user terminal of claim 6, wherein the user terminal on receiving the command to hand over the session to the CS access after making the determination to switch to the WiFi access, to send the SIP re-INVITE message to the telecommunications network as soon as the user terminal has switched to the WiFi access.

8. A network entity in a telecommunications network, the network entity comprising:
an interface for sending and receiving communications to and from other network entities in the telecommunications network,
a processor; and
memory having instructions implemented by the processor, whereby the network entity is operable to:
receive a Session Initiation Protocol, SIP, re-INVITE message from a user terminal indicating that the user terminal with a session is attached to the telecommunications network via a WiFi access;
send instructions to the other network entities to ensure that the user terminal continues the session with the WiFi access and that the session is not handed over to a Circuit Switched, CS, access per Single Radio Voice Call Continuity, SRVCC, procedures.

9. The network entity of claim 8, further configured, after receiving the SIP re-INVITE message and subsequently receiving a message from a MSC requesting a hand-over to the CS access, to return a message to the Mobile Switching Centre, MSC, rejecting the handover request together with an error indication.

10. The network entity of claim 8, further configured, on receiving the SIP re-INVITE message after receiving a message from a Mobile Switching Centre, MSC, requesting a handover to the CS access, to initiate termination of the handover procedure.

11. The network entity of claim 10, further configured, on receiving the message requesting a handover to the CS access, forwarding the message to a Session Call Continuity Application Server, SCC AS, to initiate a fallback timer and on receiving the SIP re-INVITE message, forwarding the SIP re-INVITE message to the SCC AS to stop the fallback timer so as to terminate the handover procedure.

12. The network entity of claim 10, further configured, on receiving the SIP re-INVITE message to send a message to the MSC to terminate the handover procedure.

13. The network entity of claim 8, wherein the network entity is configured as an Access Transfer Control Function (ATCF).

14. A method implemented by a user terminal adapted for wireless telecommunications using any of a plurality of different radio access technologies including a Circuit Switched, CS, access and a Packet Switched, PS access, and wherein the PS access includes access via a Long Term Evolution, LTE, network and a WiFi access via a Wireless Local Area Network, WLAN, the method comprising:

making a determination to switch a session from the PS LTE access to the WiFi access;

switching to the WiFi access;

sending a Session Initiation Protocol, SIP, re-INVITE message to a telecommunications network, wherein the SIP re-INVITE message indicating that the user terminal with the session is attached to the telecommunications network via the WiFi access; and after switching to the WiFi access, ignoring or rejecting a command received to hand over the session to the CS access, where the command is based on Single Radio Voice Call Continuity, SRVCC, procedures.

15. The method of claim 14, wherein the user terminal on receiving the command to hand over to the CS access after making the determination to switch to the WiFi access, to send the SIP re-INVITE message to the telecommunications network as soon as the user terminal has switched to the WiFi access.

* * * * *